United States Patent [19]

Dervan et al.

[11] Patent Number: 4,786,691

[45] Date of Patent: Nov. 22, 1988

[54] COATING COMPOSITION OF A HYDROXY FUNCTIONAL EPOXY ESTER RESIN AND POLYCAPROLACTONE DIOL

[75] Inventors: Andrew H. Dervan, Grosse Pointe Farms; Panagiotis I. Kordomenos, Mt. Clemens, both of Mich.

[73] Assignee: E. I. Du Pont de Nemours and Company, Wilmington, Del.

[21] Appl. No.: 82,655

[22] Filed: Aug. 7, 1987

Related U.S. Application Data

[62] Division of Ser. No. 800,942, Nov. 22, 1985, Pat. No. 4,713,425.

[51] Int. Cl.[4] ............ C08G 63/06; C08G 63/20; C08G 63/60; C08L 63/02
[52] U.S. Cl. .................... 525/438; 525/440; 525/528; 525/533; 523/454; 523/455; 523/464
[58] Field of Search ............... 525/438, 440, 528, 533

[56] References Cited

U.S. PATENT DOCUMENTS

| 2,890,208 | 6/1959 | Young et al. | 528/357 |
|---|---|---|---|
| 3,203,920 | 8/1965 | Nikles et al. | 524/110 |
| 3,215,757 | 11/1965 | Scheibli et al. | 525/112 |
| 3,382,210 | 5/1968 | Wyart et al. | 528/91 |
| 3,707,526 | 12/1972 | Gannon et al. | 525/533 |
| 3,792,112 | 2/1974 | Gannon et al. | 525/533 |
| 3,816,280 | 6/1974 | Watt | 522/32 |
| 3,951,891 | 4/1976 | Topfl et al. | 524/538 |
| 3,960,979 | 6/1976 | Khanna | 525/110 |
| 4,018,848 | 4/1977 | Khanna | 525/110 |
| 4,119,595 | 10/1978 | Bauer et al. | 523/400 |
| 4,148,772 | 4/1979 | Marchetti et al. | 523/415 |
| 4,196,270 | 4/1980 | Chattha | 525/110 |
| 4,252,935 | 2/1981 | Anderson et al. | 528/45 |
| 4,296,005 | 10/1981 | Di Benidetti | 525/510 |
| 4,343,925 | 8/1982 | Chang et al. | 525/440 |
| 4,436,878 | 3/1984 | Batzill et al. | 525/528 |
| 4,522,984 | 6/1985 | Watanabe et al. | 525/415 |
| 4,569,973 | 2/1986 | Tyrell et al. | 525/437 |

*Primary Examiner*—John C. Bleutge
*Assistant Examiner*—Robert E. L. Sellers, II
*Attorney, Agent, or Firm*—Hilmar L. Fricke

[57] ABSTRACT

A solvent-based thermosetting coating composition comprising a hydroxy functional epoxy ester resin, and polycaprolactone diol, and blocked polyisocyanate crosslinking agent. The coating composition may be formulated as hot sprayable, high solids coating composition suitable for use as chip resistant automotive vehicle primer adapted for use on body panel areas subject to chipping by stones, gravel and other road debris. Alternatively, the composition may be formulated as a high solids composition sprayable with conventional spraying equipment. The resin is formed by reaction of diepoxide chain extended substantially simultaneously with diphenol and dicarboxylic acid and chain terminated with acid component comprising primary hydroxy functional acid.

21 Claims, No Drawings

COATING COMPOSITION OF A HYDROXY FUNCTIONAL EPOXY ESTER RESIN AND POLYCAPROLACTONE DIOL

CROSS REFERENCE TO RELATED APPLICATIONS

This application is a divisional application of Ser. No. 800,942, filed Nov. 22, 1985, now U.S. Pat. No. 4,713,425.

Reference is made to concurrently filed and commonly assigned related U.S. application Ser. No. 800,887 filed Nov. 22, 1985 entitled "Chip Resistant Primer Composition V", now U.S. Pat. No. 4,699,957, and Ser. No. 808,763 filed Dec. 13, 1985 entitled "Chip Resistant Primer Composition V", now U.S. Pat. No. 4,701,502, both to Kordomenos et al.

TECHNICAL FIELD

This invention relates to a solvent-based, thermosetting coating composition comprising a hydroxy functional epoxy ester resin, a high molecular weight linear polycaprolactone diol and blocked polyisocyanate crosslinking agent. It relates also to such coating composition formulated, for example, as a hot sprayable, high solids coating composition suitable for use as a chip resistant automotive vehicle primer adapted for use on body panel areas subject to chipping by stones, gravel and other road debris.

BACKGROUND

Automobile manufacturers, in their efforts to extend the expected life of automobile sheet metal and the like, have directed considerable attention to various processes and compositions designed to result in not only improved corrosion resistance but also improved chip resistance properties. In particular, research and development efforts have recently been directed to obtaining primer compositions which are flexible and chip resistant and which give corrosion protection while exhibiting good humidity and solvent resistance, as well as good intercoat adhesion. New automobile designs and concern about chipping in areas exposed to stones, gravel and other road debris, e.g. rocker panels, have demanded such chip resistant primers which can be applied in reasonable thicknesses by techniques which do not require extensive and expensive processing modifications during painting operations. To date available primers, whether high or low solids, have not proven suitable.

In order to overcome the aforementioned chipping problem it has been common to apply relatively thick chip resistant coatings in body panel regions, which are inclined to chip, prior to application of still another primer composition. One such chip resistant sealer material which has been employed is a polyvinyl chloride plastisol sealer which has been applied with airless spraygun equipment in thicknesses of about 20 mils in regions subject to high levels of chipping. Problems attendant with such thick coatings are readily apparent. Because of the thickness in the region to which it is applied, these materials present an appearance problem often resulting in waviness and roughness in the final coating on the sheet metal. Often times surface imperfections also result from the fact that a primer is applied over the top of this sealer, with the primer and sealer being cured together. As a result some solvent and plasticizer tend to be driven out of the polyvinyl chloride plastisol and result in a wavy and rough surface. Still further problems associated with the use of such polyvinyl chloride plastisol sealers and the like involve application technique. Since the polyvinyl chloride plastisol sealers and the like must be applied in thicknesses of 20 mils or greater in order to obtain good adhesion, they cannot be feathered down to blend in with other regions of the sheet metal which do not require the additional chip protection. Thus, the materials must be applied using a masking technique whereby those regions which are not to be coated with the sealer material are masked in a separate operation prior to application of sealer. This masking is then removed after the sealer is applied. It would obviously be desirable to eliminate these additional steps in the application of the chip resistant sealer material.

Accordingly, it is a preferred object of this invention to provide a novel solvent based, thermosetting coating composition adapted for use as a chip resistant primer, which primer may be applied in thicknesses of less than 20 mils and which may be feathered in such a manner as to blend with paint in other areas of the substrate to be painted which do not require chip resistant coating.

It is another object of the invention to provide novel coating compositions which comprise crosslinkable hydroxy functional epoxy ester resins, a high molecular weight linear polycaprolactone diol and blocked polyisocyanate crosslinking agent, which provide high crosslinking efficiency and hard, tough cured films at minimum bake temperatures such as when applied as automotive primers. In this regard, it is a particular object of the invention to provide thermosetting coating composition of sufficiently low Volatile Organic Content (VOC) to aid in meeting governmental emissions guidelines and yet which can be applied to a substrate by spraying or other known method.

It is another object of the invention to provide a composition which will form a coating on a substrate, which coating has advantageous physical properties including, for example, humidity and solvent resistance, flexibility and corrosion protection for the underlying substrate.

Additional aspects and advantages of the invention will be apparent from the following description thereof.

DISCLOSURE OF THE INVENTION

According to the present invention, novel thermosetting coating compositions are provided which are especially advantageous for use as high solids organic solvent based thermosetting compositions to provide chip resistant coatings. A coating composition of the invention, in addition to solvent and any pigments and additives such as, for example, catalysts, flow control agents and the like, comprises:

(A) hydroxy functional epoxy ester resin having a number average molecular weight ($\overline{M}n$) of between about 1,000 and about 4,000 and being the reaction product of diepoxide chain extended with diphenol and dicarboxylic acid and either subsequently or simultaneously chain terminated with acid component comprising primary hydroxy functional acid, wherein the diepoxide is reacted substantially simultaneously with the diphenol and dicarboxylic acid in amounts sufficient to give a weight per epoxide (WPE) of between about 500 and about 2,500, preferably between about 500 and about 1,500. Preferably the diphenol and dicarboxylic acid are employed in a ratio of 10/90 to 90/10 by weight;

(B) linear polycaprolactone diol having a molecular weight of between about 1500 and about 5000, wherein (A) and (B) are included in the composition in a weight ratio between about 4:1 and 1:4; and (C) blocked polyisocyanate crosslinking agent comprising at least two isocyanate groups which have been blocked by reaction with an active hydrogen bearing blocking agent which de-blocks at the cure temperature of the composition. The crosslinking agent is included in the composition in an amount equal to between about 10 and about 50 percent of the combined weight of (A) and (B) in the composition.

Particularly preferred compositions of the invention are those formulated as high solids coating compositions having solids levels in the range of 65–80% solids and which are applied as chip resistant primers in those areas of automotive panels, such as rocker panels, which are exposed to high levels of chipping. Such compositions may be applied in thicknesses ranging from 1 to 25 mils wet to obtain final coatings in the range of 1 to 12 mils dry, and may be feathered down to blend in with paint applied to regions outside that requiring additional chip resistance protection. Generally, the compositions of this solids level may be applied using hot spray equipment at temperatures in the range of room temperature, i.e., about 70° F., to about 160° F.

Other preferred compositions of the invention are those formulated as high solids coating compositions adapted to be applied by conventional spraying onto a substrate. These high solids coating compositions may have a solids level in the range of 50–60% and are especially useful as a primer coating on the bare, unpolished metal surface of an automotive vehicle. As used herein, a high solids coating composition is one having a volatile organic content of about 479g/l (4.0 lb./gal.) or less.

Other features and advantages of this invention will become more apparent from the following, detailed description thereof including the preferred embodiments and best mode of carrying out this invention.

DETAILED DESCRIPTION OF THE INVENTION

Thermosetting coating compositions of the invention comprise hydroxy functional epoxy ester resin, high molecular weight linear polycaprolactone diol and blocked polyisocyanate crosslinking agent. The hydroxy functional epoxy ester resin has a number average molecular weight ($\overline{Mn}$) of between about 1,000 and about 4,000 and is the reaction product of diepoxide chain extended with diphenol and dicarboxylic acid and either subsequently or simultaneously chain terminated with acid component comprising primary hydroxy functional acid. The diphenol and dicarboxylic acid are reacted substantially simultaneously with diepoxide in amounts sufficient to give a weight per epoxide (WPE) of between about 500 and about 2,500, preferably between about 500 and about 1,500. Preferably the diphenol and dicarboxylic acid are employed in a ratio of 10/90 to 90/10 by weight.

The linear polycaprolactone diol has a molecular weight of between about 1500 and about 5000, preferably between about 2000 and about 4000. These polycaprolactone diols may be prepared by polymerizing lactone monomers, preferably epsilon-caprolactone monomers, with initiators comprising one or more compounds having two functional groups each having an active hydrogen. The epoxy ester resin and the polycaprolactone diol are included in the composition in a weight ratio of between about 1:4 and 4:1, preferably in a weight ratio of about 1:1. The blocked polyisocyanate crosslinking agent comprises at least two isocyanate groups which have been blocked by reaction with an active hydrogen bearing blocking agent which de-blocks at the cure temperature of the composition.

The blocked polyisocyanate crosslinking agent is included in the composition in an amount equal to between about 10 and about 50 percent, preferably between about 20 and about 40 percent, of the combined weight of the hydroxy functional epoxy resin and polycaprolactone diol in the coating composition. The blocked polyisocyanate crosslinking agent preferably is selected from the group consisting of, but is necessarily limited to, blocked trifunctional isocyanurate ring containing polyisocyanates and oligoester modified blocked isocyanates.

It is believed to be a significant characterizing aspect of the coating composition of the present invention that the polycaprolactone diol portion of the composition gives the cured composition flexibility as well as toughness, two key properties when choosing a primer for use in areas susceptible to chipping. It is a further characterizing aspect of the cured composition that it includes epoxy resin portions, i.e., from the hydroxyl functional epoxy ester resin, which give the cured composition excellent corrosion resistance properties.

Preferred hydroxy functional epoxy ester resins of the invention include significant aromatic content which is believed to enhance corrosion resistance properties. Even though aromatics tend to increase the brittleness of polymers and compositions including such polymers, it is possible to include them since, as mentioned above, the polycaprolactone portion of the cured composition gives the composition increased flexibility which can more than compensate for any such brittleness. A particularly preferred embodiment of the hydroxy functional epoxy ester resin of the invention is prepared from aromatic containing diepoxide. Also, as discussed hereafter, the dicarboxylic acid reactant employed in preparation of the hydroxy functional epoxy ester resin may also include aromatic units.

Each of the above major components of the compositions as well as other components and other aspects of the invention are described hereinafter in greater detail.

A. HYDROXY FUNCTIONAL EPOXY ESTER RESIN

As described above, this resin is the reaction product of diepoxide chain extended substantially simultaneously with diphenol and dicarboxylic acid and either subsequently or simultaneously chain terminated with hydroxy functional acid component comprising primary hydroxy functional acid.

Each of the reactants employed in the preparation of the hydroxy functional epoxy ester resin is described in greater detail below.

(i) Diepoxide Reactant

The diepoxide reactant employed in the manufacture of the hydroxy functional epoxy ester resin can be any of numerous diepoxides including diphenol chain extended epoxides, many of which are commercially available and which will be apparent to the skilled in the art in view of the present disclosure. While, ultimately, the choice of the diepoxide reactant for preparing the hydroxy functional epoxy ester resin will depend to an extent upon the particular application intended for the coating composition, terminal diepoxides, that is diepoxides bearing two terminal epoxide groups, are generally most preferred. These are generally more reactive and therefore require reaction conditions under which undesirable side reactions, for example, epoxy-epoxy reactions and gellation, can be more easily avoided. The diepoxides which are to be chain extended with the diphenol and dicarboxylic acid may be selected from numerous diepoxides, some of which may be diphenol extended diepoxides.

Diepoxy resins, not previously extended with diphenol, may be used in the preparation of the hydroxy functional epoxy ester resin. Preferred diepoxy resins of this type include Epon 828 (trademark) and Epon 829 (trademark), which are non-extended diepoxides of the Epon series, Shell Chemical Company, Houston, Tex., as well as cycloaliphatic diepoxy resins, such as the Eponex (trademark) series, Shell Chemical Company; hydantoin epoxy resins such as, for example, Resin XB2793 (trademark), Ciba-Geigy Corporation, Ardsley, N.Y.; and any of a wide variety of acyclic or cyclic aliphatic diepoxides such as, for example, 1,4-butanediol diglycidyl ether and 4-vinyl-cyclohexene dioxide and the like. Still other suitable diepoxides which may be chain extended with dicarboxylic acid in synthesizing the epoxy-ester resin are commercially available and will be apparent to the skilled of the art in view of the present disclosure.

Still further, diepoxides previously extended with diphenol may be used in forming the hydroxy functional epoxy ester and numerous such materials are commercially available. These include certain of the well known bisphenol-A epichlorohydrin epoxy resins of the aforementioned Epon (trademark) series, e.g. Epon 1000 and Epon 1004 and the DER (trademark) series, Dow Chemical Company, Midland, Mich., e.g., DER 332. These diglycidyl ether bisphenol-A resins or higher molecular weight analogs thereof, are most preferred in view of their cost and commercial availability. Also, it will be understood from the foregoing that any mixture of compatible diepoxides may be used.

In addition to the diepoxide, a portion of the epoxy functionality can be provided by any compatible monoepoxy compound or polyepoxy compound or mixture of such compounds. The polyepoxide can be any of the well known types such as polyglycidyl ethers of polyphenols. These can be produced by etherification of polyphenol with epihalohydrin in the presence of alkali. It will be recognized by the skilled of the art in view of the present disclosure, that in some instances, particularly where a coating composition of high solids content is less important, it may be desirable to incorporate polyepoxide of higher molecular weight. Preferably, any such polyepoxide contains free hydroxyl groups in addition to epoxide groups.

While polyglycidyl ethers of polyphenol can be employed, it may be desirable to react a portion of the reactive sites (hydroxyl or in some instances epoxy) with a modifying material to vary the film characteristics of the resin. The epoxy resin may be modified, for example, with isocyanate group containing organic materials or other reactive organic materials.

Other useful polyepoxides are the novolak resins including, for example, the novolak epoxy resins ECN 1235 (trademark) and ECN 1273 (trademark), Ciba-Geigy Corporation.

According to preferred embodiments of the present invention, epoxide compounds other than diepoxide compounds provide no more than about 15% and most preferably substantially none of the total epoxide functionality in the reactants used to form the epoxy ester resin.

(ii) Diphenol Reactant

The diphenol reactants suitable for reaction with the diepoxide reactant and dicarboxylic acid in chain extension reaction include numerous commercially available materials, many of which will be readily apparent to the skilled of the art in view of the present disclosure. Preferred diphenols have the general formula (I):

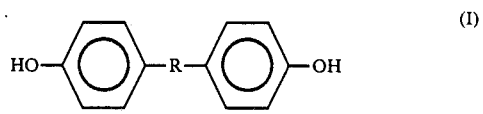

wherein R is a divalent linking moiety substantially unreactive with the diepoxide resin. Preferably R is a divalent organic linking moiety, for example $(CH_2)_n$ where n is preferably from about 1 to about 8, C=10, and the like, although inorganic moieties, for example sulfonyl and the like, are also suitable. Diphenols of this character have been found to provide good reactivity with diepoxides described above and to provide, ultimately, cured coatings of the invention having excellent physical properties, most notably excellent corrosion protection. It will be apparent to the skilled of the art in view of the present disclosure that R should be substantially unreactive with the acid component employed in preparation of the epoxy ester resin precursor. Particularly preferred diphenols include those according to formula (I) above, wherein R is selected from the group comprising a straight or branched alkylene or alkylidene moiety of one to about 10 carbons, preferably having three to four carbons and most preferably having the general formula:

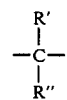

wherein R' and R" are the same or different and each is a monovalent organic moiety preferably selected from the group comprising hydrogen and lower alkyl of about one to four carbons, most preferably one or two carbons, and the like or a mixture of any of them. Preferably the diphenol has a number average molecular weight ($M_n$) between about 180 and about 500, more preferably between about 180 and about 250. Such diphenols include, for example, bisphenol-A, which is most preferred, bisphenol-B, bisphenol-F and a compatible mixture of any of them. As used herein the term diphenol may include, for example, compounds comprising a single dihydroxy substituted phenyl ring such as benzenediol. More preferred, however, are those diphenols providing two terminal, mono-hydroxy substituted phenyl rings such as in formula (I), above. Other examples of diphenols are bis-(4-hydroxy-tert-butylphenyl)-2,2-propane, bis-(hydroxy-naphthyl)methane and 1,5-dihydroxynaphthalene. Other suitable diphenols useful to form the epoxy ester resin of the present invention will be apparent to the skilled of the art in view of the present disclosure.

(iii) Dicarboxylic Acid Reactant

Dicarboxylic acids suitable for chain extending diepoxides discussed above preferably have a number average molecular weight of between about 145 and about 1000 and more preferably between about 400 and about 600. Suitable dicarboxylic acids includes numerous commercially available materials, many of which will be readily apparent to the skilled of the art in view of the present disclosure. Suitable dicarboxylic acids include saturated or unsaturated, cyclic or acyclic, aliphatic or aromatic dicarboxylic acids or a mixture thereof. Acyclic aliphatic dicarboxylic acids are generally preferred in view of the enhanced flexibility they provide to the cured coatings of the invention. Preferred dicarboxylic acids have the general formula (II):

HOOC—R'''—COOH     (II)

wherein R is a divalent linking moiety substantially unreactive with the diepoxide resin. It will be apparent to the skilled of the art in view of the present disclosure, that R''' should be substantially unreactive also with the acid component employed in preparation of the epoxy ester resin, and with hydroxy functionality (generated in the chain-extension reaction). Preferably R''' is a divalent, organic, linking moiety. Particularly preferred are those dicarboxylic acids wherein R''' is selected, from the group comprising a straight or branched alkylene or alkylidene moiety, preferably of about 4-42 carbons, for example, $(CH_2)_n$ wherein n is preferably from about 4 to about 42, and the like or a mixture thereof. Dicarboxylic acids of this character have been found to provide good reactivity with the preferred diepoxides described above and to provide, ultimately, cured coatings of the invention having excellent physical properties, most notably excellent flexibility and corrosion protection.

Exemplary dicarboxylic acids include adipic acid, 3,3-dimethylpentanedioic acid, benzenedicarboxylic acid, phenylenediethanoic acid, naphthalenedicarboxylic acid, pimelic acid, suberic acid, azelaic acid, sebacic acid, and the like or a compatible mixture of any of them. The anhydrides of these acids, where the anhydrides exist, are, of course, embraced in the term "acid" since the reaction products obtained therefrom are the same. While dicarboxylic acids according to formula (II) can be used, wherein R''' is an alkylene chain of less than 4 carbons, for example, oxalic acid, malonic acid, succinic acid, glutaric acid and the like, these are less preferred in view of the somewhat lesser degree of flexibility provided thereby. Preferably the dicarboxylic acid provides two terminal carboxyl groups. Similarly, preferred aromatic dicarboxylic acids are those wherein the carboxylic groups are more spaced apart, for example, 1,4-benzenedicarboxylic acid and 2,7-naphthalenedicarboxylic acid.

The most preferred dicarboxylic acids are substantially saturated, acyclic, aliphatic dimer acids, which are well known to the skilled of the art and readily commercially available. These are typically the dimerization reaction products of fatty acids which have from 4 to 22 carbons and a terminal carboxyl group. Of these, dimer acid of 36 carbons is most preferred since it provides excellent reactivity with the preferred diepoxides described above, provides epoxy ester reaction products of advantageously wide molecular weight distribution, and provides, ultimately, cured coatings of the invention having excellent physical properties. In addition, dimer acid of 36 carbons is readily commercially available, for example, as Empol 1014 (trademark), Empol 1016 (trademark) and Empol 1018 (trademark , each available from Emery Industries, Inc., Cincinnati, Ohio. It should be recognized that most or all commercially available dimer acids contain some portion of trimer acid, typically, for example, about 5–10% but in some cases as much as 30% or more, and also contain a usually smaller portion of monocarboxylic acid. As used herein, the term "dimer acid38 includes those containing such amounts of these materials. Most useful is the present compositions are products that contain mostly dibasic acid and none or low amounts of tribasic and monobasic acids.

Aliphatic dicarboxylic acids are seen to provide additional advantages. In particular, while not wishing to be bound by theory, it is presently understood that hydroxy functional epoxy ester resin derived therefrom wet the substrate surface better and provide enhanced adhesion between the substrate and the cured coating. They also flow better and, thus, provide an excellent smooth surface upon being cured. Also, the aliphatic units provide enhanced flexibility to the cured coating, as noted above, and this flexibility of the coating is seen to provide enhanced impact resistance, a feature even more highly desirable for chip resistant coating embodiments.

Where corrosion protection for the substrate is important, it may be preferred to employ dicarboxylic acid according to formula (II) above, wherein R''' is, at least in part, aromatic. As noted above, it is believed that such aromatics in the coating composition of the invention, such as a primer composition for a metal substrate, are more resistant to hydrolysis than are aliphatics and, therefore, provide enhanced corrosion and moisture resistance. Of course, as also noted above, according to preferred embodiments of the epoxy ester resin precursor, described above, the diepoxide reactant provides aromatic units to the resin and this would similarly contribute to corrosion and moisture resistance.

Other suitable dicarboxylic acids for the epoxy ester resin of the present invention will be apparent to the skilled of the art in view of the present disclosure.

Preferably, the chain extended diepoxide to be terminated by the acid component has a number average molecular weight ($M_n$) between about 1,200 and about 3,500, and more preferably between about 1,600 and about 2,400.

(iv) Acid Component Reactant

The acid component comprises primary hydroxy functional acid. Numerous suitable primary hydroxy functional acids will be apparent to the skilled of the art in view of the present disclosure, including many which are readily commercially available. These include $C_3$–$C_{26}$ primary hydroxy functional acids, wherein the acid contains one carboxyl group and one or more hydroxyl groups (at least one of which is a primary hydroxyl group) and no other functional groups which would substantially interfere with the preparation of the hydroxyl functional epoxy ester resin, i.e., no other functional groups which would react substantially with the chain-extension reactants described above or with the chain-extension reaction product. Preferred primary hydroxy functional acids correspond to the general chemical formula:

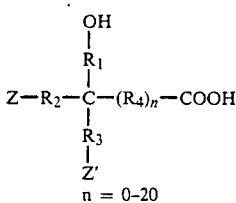

$$Z-R_2-\underset{\underset{Z'}{\overset{\overset{R_1}{|}}{C}-(R_4)_n}}{\overset{\overset{OH}{|}}{|}}-COOH$$

$$n = 0\text{-}20$$

wherein $R_1$, $R_2$, $R_3$ and $R_4$ are the same or different and each preferably is lower alkylene such as methylene or ethylene, and $Z$ and $Z'$ are selected independently from hydrogen, hydroxyl, and any other non-interfering functionality such as nitrile ester group, halogen, amide, etc. Suitable hydroxy acids which may be employed in the chain terminating reaction include, but are not limited to, dimethylolpropionic acid which is most preferred, bis(hydroxyethyl)propionic acid, bis(hydroxypropyl)propionic acid, and the like and a compatible mixture of any of them. Preferably, the primary hydroxy acid contains two or more hydroxyl groups, e.g., at least one of $Z$ and $Z'$ contains a hydroxyl group.

Optionally, the acid component may further comprise fatty acid. Suitable fatty acids include numerous commercially available fatty acids such as, for example, those derived from or contained in either animal or vegetable fat or oil. Preferred are fatty acids from about 8 to about 18 carbons, since these are found to provide flexibility to the cured coating. Also preferred among the fatty acids are the more saturated fatty acids, since it appears that olefinic unsaturation in the fatty acid can undergo a polymerization-type reaction between such double bonds during the synthesis of the epoxy ester resin of the invention. Unsaturated fatty acids are suitable for use, however, such as, for example, oleic acid, linoleic, linolenic and the like and mixtures of such acids, and can be used together with a suitable inhibitor for the polymerization-type reaction such as hydroquinone or the like, of which many are commercially available and will be apparent to the skilled of the art in view of the present disclosure. In addition, aromatic fatty acids are commercially available and can be employed. Preferred for use are the substantially saturated fatty acids such as Soya fatty acid which is most preferred, and butyric, lauric, palmitic and stearic fatty acids and the like or a compatible mixture of any of them. These are relatively inexpensive and have been found to provide good reactivity with the preferred diepoxides described above. For convenience of use, the fatty acids which are semisolid or liquid at room temperature are generally preferred over the solid fatty acids.

The hydroxy functional epoxy ester resin of the invention can be made according to techniques well known to the skilled of the art. The chain extension and chain termination reactions may be carried out sequentially, with the chain extension of the diepoxide being carried out first. According to the sequential technique, diepoxide, diphenol and dicarboxylic acid are charged into a suitable reactor and heated. The reactants are used in relative proportions to yield a chain extension reaction product bearing two unreacted epoxy groups and preferably substantially no unreacted carboxyl or phenol functionality. Suitable separation techniques are known to the skilled of the art for removal of unused reactants. It should be recognized that to assure rapid and/or more complete reaction of the diepoxide and with the diphenol and dicarboxylic acid functionality, it is usually preferred to have a catalyst present. The use of catalyst has been found to provide advantageous epoxy ester resin of the invention and is preferred. Epon 829 (trademark), mentioned above, as sold, provides a proprietary catalyst. Epon 828 (trademark), is substantially the same but does not provide such catalyst. Suitable catalysts are commerically available and include any of the well known catalysts for epoxy-phenol and epoxy-dicarboxylic acid reactions such as, for example, sodium carbonate which is preferred, and lithium neodecanoate, lithium naphthenate, lithium nanoate, other known organometallic catalysts and tertiary amine catalysts and the like or a compatible mixture of any of them. Still other preferred catalysts include formylmethylene triphenylphosphorane, formylmethyltriphenylphosphonium chloride, methyltriphenylphosphonium iodide, ethyltriphenylphosphonium acetate. Other suitable catalysts will be apparent to the skilled of the art in view of the present disclosure.

The reaction mixture is heated to at least about 140° C. (250° F.). When in the presence of catalyst, exothermic reaction will proceed with or without further heating. Typically, the reaction mixture will then reach about 149° C.-176° C. (300° F.-350° F.), depending upon the batch size and reactor vessel insulation, etc. In the absence of catalyst, such exotherm is typically not observed and continued heating is required. The progress of the reaction can be followed by acid number measurements and/or weight per epoxide (WPE).

As noted above, the diepoxide is reacted substantially simultaneously with diphenol and dicarboxylic acid in amounts sufficient to give a weight per epoxide (WPE) of between about 500 and about 2,500, preferably between about 500 and about 1,500. The relative amounts of dispoxide, diphenol and dicarboxylic acid to be reacted to form the chain extended diepoxide would be apparent to the skilled of the art in view of the desired weight per epoxide. Preferably, the acid and diphenol reacted with the diepoxide are employed in a ratio of 10:90 to 90:10.

After completion of the above chain extension reaction of diepoxide with the diphenol and dicarboxylic acid, the acid component is charged into the reaction vessel. The reaction is exothermic and drives itself to completion. The chain extended reaction product is reacted with the acid component in chain terminating reaction preferably in approximately 1 to 1 equivalent ratio. This ratio is preferred since excess epoxy could result in gelation of the reaction mixture.

Alternatively the hydroxy functional epoxy ester resin may be made by a simultaneous technique, whereby the reactants are combined and reacted in a single batch. Due to the relative reactivity of the functional groups, the chain extension and the chain termination reactions will both take place. If the reactions are carried out simultaneously, the reactants are used in amounts suitable to yield the desired reaction ratio in view of the relative reactivity of the dicarboxylic acid and the acid component and in view of the desired molecular weight for the resin product. It appears that present invention compositions comprising hydroxy functional epoxy resin made by the simultaneous reaction technique have lower viscosities and are thus more easily sprayable than similar compositions having the same solids level and comprising such hydroxy functional epoxy resin made by the sequential reaction technique.

B. LINEAR POLYCAPROLACTONE DIOL

The linear polycaprolactone diol employed in the coating composition of the present invention has a molecular weight of between about 1500 and about 5000, preferably between about 2000 and about 4000. Suitable polycaprolactone diols are well known to those skilled in the art and can be formed by polymerizing lactones in the presence of an initiator by methods well known to those skilled in the art. Such linear polycaprolactone diols also are commerially available, for example, from Union Carbide, Danbury, Conn. in the TONE (trademark) series, e.g., TONE 0260. This series comprises polycaprolactone dils as well as polycaprolactone triols.

The preparation of suitable linear polycaprolactone diols is described, for example, in U.S. Pat. Nos. 2,914,556 and 3,169,945 to Hostettler et al. Polymerization of the lactone monomer to form the polycaprolatone diol of this invention is initiated by reaction with one or more compounds having two functional groups each having an active hydrogen capable, with or without the aid of a catalyst, of opening the lactone ring and adding it as an open chain without forming water of condensation. Compounds suitable for use to initiate the polymerization of the lactones, referred to herein as initiators, include but are not limited to, diamines, diols, amino alcohols, diacids, and hydroxy-carboxylic acids. Also suitable are amides, sulfonamides, hydrozones, carbazone, and oximes containing two reactive groups. The lactone starting material which may be employed in forming the polycaprolactone diol component of the invention may be any lactone, or combination of lactones, having at least six carbon atoms, for example, from six to eight carbon atoms, in the ring and at least one hydrogen substituent on the carbon atom which is attached to the oxy group in said ring. In one aspect, the lactone used as a starting material can be represented by the general formula:

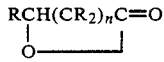

in which n is at least four, for example, from four to six, at least n+2R's are hydrogen, and the remaining R's are substituents selected from the group consisting of hydrogen, alkyl, cycloalkyl, alkoxy and single ring aromatic hydrocarbon radicals. Lactones having greater numbers of substituents other than hydrogen on the ring, and lactones having five or less carbon atoms in the ring, are considered unsuitable for the purposes of the invention because of the tendency that polymers thereof have to revert to the monomer, particularly at elevated temperature.

The lactones preferred in this invention for forming the polycaprolactone diol are the epsilon-caprolactones having the general formula:

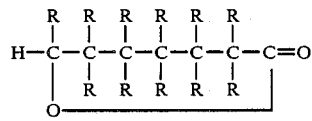

wherein at least six of the R's are hydrogen and the remainder are hydrogen, alkyl, cycloalkyl, alkoxy or single ring aromatic hydrocarbon radicals, none of the substituents contain more than about twelve carbon atoms, and the total number of carbon atoms in the substituents on a lactone ring does not exceed about twelve. Unsubstituted epsilon-caprolactone, in which all the R's are hydrogen, is derived from 6-hydroxyhexanoic acid and is most preferred. Substituted epsilon-caprolactones, and mixtures thereof, are available by reacting a corresponding substituted cyclohexanone with an oxidizing agent such as peracetic acid.

Among the substituted epsilon-caprolactones considered most suitable for the purposes of the invention are the various monoalkyl epsilon-caprolactones such as the monomethyl-, monoethyl-, monopropyl-, monoisopropyl-, etc. to monododecyl epsilon-caprolactones; dialkyl epsilon-caprolactones in which the two alkyl groups are substituted on the same or different carbon atoms, but not both on the epsilon carbon atom; trialkyl epsilon-caprolactones in which two or three carbon atoms in the lactone ring are substituted, so long as the epsilon carbon atom is not disubstituted; alkoxy epsilon-caprolactones such as methoxy and ethoxy epsilon-caprolactones; and cycloalkyl, aryl, and aralkyl epsilon-caprolactones such as cyclohexyl, phenyl and benzyl epsilon-caprolactones.

Lactones having more than six carbon atoms in the ring, e.g., zeta-enatholactone and eta-caprylolactone may also be polymerized to form the linear polycaprolactone diol employed in the invention.

Diols that are suitable as bifunctional initiators include glycols of the formula $HO(CH_2)_nOH$ in which n equals 2 to 10, glycols of the formula $HO(CH_2CH_2O)_nH$ and $HOCHCH_3)CH_2O)_nH$ in which n equals 1 to 40, such as ethylene glycol, diethylene glycol, and the like, 2,2-dimethyl-1,3-propanediol, 2,2-diethyl-1,3-propanediol, 3-methyl-1,5-pentanediol, N-methyl- and N-ethyl- diethanol amines, various cyclohexanediols such as 4,4'-methylenebiscyclohexanol, 4,4'-isopropylidenebiscyclohexanol, various xylenediols, various hydroxymethyl-phenethyl alcohols, various hydroxymethyl-phenylpropanols, various phenylenediethanols, various phenyldipropanols, and various heterocyclic diols such as 1,4-piperazinediethanol. Other suitable diols include polyoxyalkylated derivatives of difunctional compounds having two reactive hydrogen atoms. These difunctional compounds may contain primary or secondary hydroxyls, phenolic hydroxyls, primary or secondary amino groups, amido, hydrazino, guanido, ureido, mercapto, sulfino, sulfonamide, or carboxyl groups. They are obtainable by reacting diols of the class $HO(CH_2)_nOH$, wherein n equals 2 to 10, propylene glycol, thiodiethanol, xylenediols, 4,4'-methylenediphenol, 4,4'-isopropylidenediphenol, and resorcinol; mercapto alcohols, like mercaptoethanol; dibasic acids, such as maleic, succinic, glutaric, adipic, pimelic, sebacic, phthalic, tetrahydrophthalic, and hexahydrophthalic; phosphorous acid; aliphatic, aromatic and cycloaliphatic primary monoamines, like methylamine, ethylamine, propylamine, butylamine, aniline, cyclohexylamine; secondary diamines, like N,N'-dimethylethylenediamine; and amino alcohols containing a secondary amino group, like N-methylethanolamine, with alkylene oxides such as ethylene oxide, propylene oxide, 1-butylene oxide, 2-butylene oxide, isobutylene oxide, butadiene monooxide, styrene dxide, and also mixtures of these monoepoxides.

Other useful bifunctional initiators are polymers of monoepoxides obtainable by polymerizing with such catalyst as oxonium salts of hydrogen halides; metal or nonmetal halides whose etherates are oxonium complexes; electrophilic metal or non-metal halides in the presence of hydrogen halides, acyl halides, or anhydrides of inorganic and organic acids; and inorganic acids or anhydrides thereof whose anions show little tendency to polarize. Polymers containing hydroxyl end groups can be obtained by treating these products with alkaline reagents upon completion of the polymerization reaction. Among suitable monoepoxides for preparing such polymers are tetrahydrofuran, trimethylene oxide, propylene oxide, ethylene oxide and mixtures thereof.

Difunctional amino alcohols capable of initiating the polymerization of lactones include aliphatic amino alcohols of the general formula $HO(CH_2)_nNH_2$, wherein n equals 2 to 10, N-methylethanolamine, isopropanolamine N-methylisopropanolamine, aromatic amino alcohols like para-amino-phenethyl alcohol, and para-amino-alpha-methylbenzyl alcohol, and various cycloaliphatic amino alcohols like 4-amino-cyclohexanol.

Suitable diamines include aliphatic diamines of the general formula $H_2N(CH_2)_nNH_2$; monosecondary diamines of the general formula $R''NH(CH_2)_nNH_2$; disecondary diamines of the general formula $R''NH(CH_2)_nNHR''$, where n equals 2 to 10 and where $R''$ is alkyl, aryl, aralkyl or cycloalkyl; aromatic diamines, like metaphenylenediamine, para-phenylenediamine, toluene-2,4-diamine, toluene-2,6-diamine, 1,5-naphthalenediamine, 1,8-naphthalenediamine, meta-xylylenediamine, para-xylylenediamine, benzidine, 3,3'-dimethyl-4,4'-biphenyldiamine, 3,3'-dimethoxy-4,4'-biphenyldiamine, 3,3'-dichloro-4,4'-biphenyldiamine, 4,4'-methylenedianiline, 4,4'-ethylenedianiline, 2,3,5,6,-tetramethyl-para-phenylenediamine, 2,5-fluorenediamine, and 2,7-fluorenediamine; cycloaliphatic diamines like 1,4-cyclohexanediamine, 4,4'-methylenebiscyclohexylamine, and 4,4'-isopropylidenebiscyclohexylamine; and heterocyclic amines such as piperazine, 2,5-dimethylpiperazine, and 1,4-bis(3-aminopropyl)piperazine.

Representatives of the many dicarboxylic acids that are suitable as bifunctional initiators are such dicarboxylic acids as oxalic acid, succinic acid, maleic acid, glutaric acid, adipic acid, pimelic acid, suberic acid, azelaic acid, sebacic acid, 4,4'-oxydibutyric acid, 5,5'-oxydivaleric acid, 6,6'-oxydihexanoic acid, 4,4'-thiodibutyric acid, 5,5'-thiodivaleric acid, 6,6'-thiodihexanoic acid, itaconic acid, phthalic acid, isophthalic acid, terephthalic acid, 1,5-naphthoic acid, 2,7-naphthoic acid, 2,6-naphthoic acid, 3,3'-methylenedibenzoic acid, various tetrahydrophthalic acids, and various hexahydrophthalic acids. Suitable hydroxy- and aminocarboxylic acids include 2-hydroxypropionic acid, 6-hydroxycaproic acid, 11-hydroxy-undecanoic acid, salicylic acid, parahydroxybenzoic acid, beta-alanine, 6-aminocaproic acid, 7-aminoheptanoic acid, 11-aminoundecanoic acid, and paraaminobenzoic acid.

The initiator is believed to open the lactone ring to produce an ester or amide having two terminal groups that are capable of opening further lactone rings and thereby of adding more and more lactone to the molecule. Thus, for example, the polymerization of epsilon-caprolactone initiated with a diol is believed to take place primarily as follows:

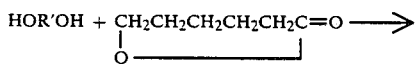

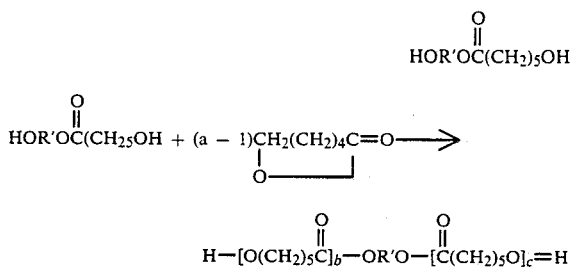

wherein a is the total number of mols of lactone reacted per mol of initiator and $b+c=a$.

To initiate and continue the polymerization of the lactone, the lactone and the initiator are preferably heated to a temperature between about 130° and 200° C. In order to achieve a practical and desirable rate of reaction with a minimum of decomposition. The temperature may be considerably lower however, i.e., as low as about 50° C. at the sacrifice of speed of reaction. It may also be considerably higher, i.e., up to about 300° C., although care must be taken at such higher temperatures because of the more likely losses, at temperatures above 250° C., due to decomposition or undesirable side reactions. Generally, therefore, a temperature range of 50° to 300° C. is considered operable and a more limited range between about 130° and 200° C. is considered preferable.

It is within the ability of those skilled in the art to determine a suitable amount of initiator to use to achieve a linear polycaprolactone diol product of desired molecular weight. The polymerization may be, and preferably is, carried out with the use of a catalyst, such as a basic or neutral ester interchange catalyst, to accelerate the reaction. Among catalysts suitable for this purpose are such metals as lithium, sodium, potassium, rubidium, cesium, magnesium, calcium, barium, strontium, zinc, aluminum titanium, cobalt, germanium, tin, lead, antimony, arsenic and cerium, as well as the alkoxides thereof. Additional suitable catalysts are, by way of example, the carbonates of alkali- and alkaline earth metals, zinc borate, lead borate, zinc oxide, lead silicate, lead arsenate, litharge, lead carbonate, antimony trioxide, germanium dioxide, cerium trioxide, cobaltous acetate and aluminum isopropoxide. Catalyst concentrations between about 0.001 and 0.5%, based on the weight of the starting lactones, are suitable. The preferred range is from 0.01 to 0.2%.

While not wishing to be bound by theory, it is presently believed that the linear polycaprolactone diol is characterized by the presence of series of interconnected, substantially linear units or groups composed of carbon, hydrogen and oxygen. The interconnected units are opened lactone residues each having a terminal oxy group at one end, a carbonyl group at the other end, an intermediate chain of at least five carbon atoms and at least one hydrogen substituent on the carbon atom in the intermediate chain that is attached to the terminal oxy group. The oxy group of one lactone residue is connected to the carbonyl group of an adjacent lactone residue in the series and the oxy group of the last lactone residue in a series is connected to a hydrogen to form a terminal hydroxyl group at each end of the series. The hydroxy functional epoxy ester resin and the linear polycaprolactone diol are included in the coating composition in a weight ratio of between about 1:4 and 4:1, preferably in a weight ratio of about 1:1.

C. Blocked Polyisocyanate Crosslinking Agent

The crosslinking agent employed in the novel solvent based coating compositions of the invention comprises blocked polyisocyanate. The novel solvent based coating compositions of the invention, as a result of employing blocked polyisocyanate crosslinking agents, exhibit exceptional shelf stability even when corrosion inhibiting pigments such as zinc chromate are used in high concentrations.

As used herein "blocked polyisocyanate" means an isocyanate compound containing two or more isocyanate groups, all of which have been reacted with a material which will prevent reaction of the isocyanate group at room temperature with compounds that conventionally react with such groups, and at least some of which will permit that reaction to occur at higher (cure) temperatures. In general the blocked polyisocyanate may be prepared by reacting a sufficient quantity of an active hydrogen containing blocking agent with the polyisocyanate to insure that no free isocyanate groups are present. The blocking agent may be represented by the formula BH and may be selected from numerous materials, hereinafter discussed, which bear an active hydrogen.

The blocked polyisocyanate crosslinking agent is included in compositions of the invention in an amount equal to between about 10 and about 50 percent, preferably in an amount equal to between about 20 and about 40 percent, of the combined weight of hydroxy functional epoxy ester resin (A) and linear polycaprolactone diol (B) in the coating composition. Blocked polyisocyanates of numerous types may be employed in the compositions of the invention. Particularly suitable blocked polyisocyanates, which will be discussed further hereinafter, include blocked polymethylene polyphenol isocyanates, isocyanurate ring containing blocked polyisocyanates and certain oligoester modified blocked polyisocyanates.

In the preparation of the blocked polyisocyanate crosslinking agent, any suitable organic polyisocyanate may be used. Representative examples are the aliphatic compounds such as trimethylene, tetramethylene, pentamethylene, hexamethylene, 1,2-propylene, 1,2-butylene, 2,3-butylene, 1,3-butylene, ethylidine and butylidene diisocyanates; the cycloalkylene compounds such as 1,3-cyclopentane, 1,4-cyclohexane, and 1,2-cyclohexane diisocyanates; the aromatic compounds such as m-phenylene, p-phenylene, 4,4'-diphenyl, 1,5-naphthalene, and 1,4-naphthalene diisocyanates, the aliphatic-aromatic compounds such as 4,4'-diphenylene methane, 2,4- or 2,6-tolylene, or mixtures thereof, 4,4'-toluidine, and 1,4-xylylene diisocyanates; substituted aromatic compounds such as dianisidine diisocyanate, 4,4'-diphenylether diisocyanate and chlorodiphenylene diisocyanate; the triisocyanates such as triphenyl methane-4,4',4"-triisocyanate, 1,3,5-triisocyanate benzene and 2,4,6-triisocyanate toluene; the tetraisocyanates such as 4,4'-diphenyl-dimethyl methane-2,2',5,5'-tetraisocyanate; and the polymerized polyisocyanates such as tolylene diisocyanate dimers and trimers, and the like.

In addition, the organic polyisocyanate may be a prepolymer derived from a polyol including polyether polyol or polyester polyol, including polyethers which are reacted with excess polyisocyanates to form isocyanate-terminated prepolymers. The polyols may be simple polyols such as glycols, e.g., ethylene glycol and propylene glycol, as well as other polyols such as glycerol; trimethylolpropane, pentaerythritol, and the like, as well as mono-ethers such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxyl-terminated polyethers and can be linear or branched. Examples of polyethers include polyoxyethylene glycol, polyoxypropylene glycol, polyoxytetramethylene glycol, polyoxyhexamethylene glycol, polyoxynonamethylene glycol, polyoxydecamethylene glycol, polyoxydodecamethylene glycol and mixtures thereof. Other types of polyoxyalkylene glycol ethers can be used. Especially useful polyether polyols are those derived from reacting polyols such as ethylene glycol, diethylene glycol, triethylene glycol, 1,4-butylene glycol, 1,3-butylene glycol, 1,6-hexanediol, and their mixtures; glycerol, trimethylolethane, trimethylolpropane, 1,2,6-hexanetriol, pentaerythritol, dipentaerythritol, tripentaerythritol, polypentaerythritol, sorbitol, methyl glucosides, sucrose and the like with alkylene oxides such as ethylene oxide, propylene oxide, their mixtures, and the like.

A particular class of aromatic polyisocyanates which may be employed in the novel solvent based coating compositions of the invention are polymethylene polyphenol isocyanates having the formula:

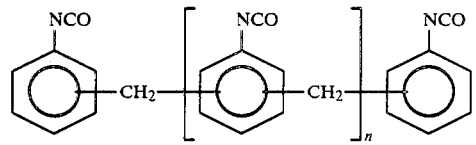

wherein n equals 1 to 3. Such compounds, sold under the tradename "PAPI" by the Upjohn Chemical Company of Kalamazoo, Mich., have proven to be particularly useful in compositions of the invention, resulting in compositions exhibiting desirable toughness in the final cured coating.

The active hydrogen containing blocking agents which are reacted with the above described organic diisocyanates may be selected from numerous blocking agents which will be apparent to those skilled in this art. Representative of those blocking agents which are preferred are those selected from the group consisting of (i) aliphatic, cycloaliphatic and aromatic alkyl monoalcohols; (ii) hydroxyl amines; (iii) oximes; (iv) lactams; and (v) triazoles. Any suitable aliphatic, cycloaliphatic or aromatic alkyl monoalcohol may be used as a blocking agent in accordance with the present invention. For example, aliphatic alcohols, such as methyl, ethyl, chloroethyl, propyl, butyl, amyl, hexyl, heptyl, octyl, nonyl, 3,3,5-trimethylhexyl, decyl, and lauryl alcohols, and the like may be employed. Suitable cycloaliphatic alcohols include, for example, cyclopentanol, cyclohexanol and the like, while aromatic-alkyl alcohols include phenylcarbinol, methylphenylcarbinol, and the like. Minor amounts of even higher molecular weight relatively non-volatile monoalcohols may be used, if desired, to serve as plasticizers in the coatings provided by the invention. EXamples of hydroxyl amines which may be employed as blocking agents include ethanol amine and propanol amine. Suitable oxime blocking agents include, for example, methylethylketone oxime, acetone oxime and cyclohexanone oxime. Examples of lactams which may be used as blocking agents are -caprolactam, -butyrolactam and pyrrolidone, while suitable triazoles include compounds such as 1,2,4-triazole, 1,2,3-benzotriazole, 1,2,3-tolyl triazole and 4,5-diphenyl-1,2,3-triazole. Particularly preferred active hydrogen containing blocking agents are methylethyl ketoxime and 2-ethylhexanol.

(i) Isocyanurate Ring Containing Blocked Isocyanate Compounds

Within the scope of the above general class of blocked polyisocyanate crosslinking agents, a particular class type of blocked polyisocyanate crosslinking agent which may be employed in the novel solvent based coating compositions of the invention comprises isoycanurate ring containing blocked isocyanate compounds. In general, these blocked polyisocyanates may be formed by blocking with the aforementioned blocking agent isocyanurate ring containing polyisocyanates. These compounds may be formed by cyclotrimerization of difunctional isocyanates. Usually, the reaction does not stop in this stage and continues through the formation of polyfunctional oligomers or a mixture of such oligomers with a portion of the pure trifunctional polyisocyanate. Mixtures of trifunctional product and various polyfunctional oligomers are commercially available.

A particular desirable blocked polyisocyanate crosslinking agent is the blocked form of the pure trifunctional isocyanurate represented by the following formula:

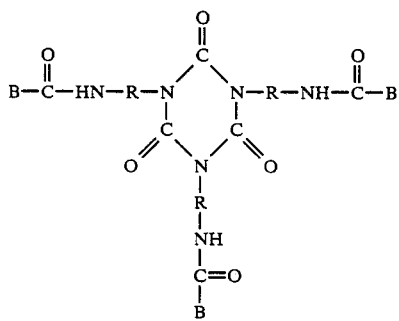

wherein R is selected from the group consisting of aliphatic, cycloaliphatic and aromatic groups and combinations thereof and B is the residue of an active hydrogen containing blocking agent. More specifically, this compound is disclosed in U.S. Pat. No. 4,491,663, the disclosure of which is incorporated herein by reference.

(ii) Oligoester Modified Blocked Polvisocyanates

Still further particular blocked polyisocyanates useful as crosslinking agents in the novel solvent based coating compositions of this invention are oligoester modified blocked polyisocyanates prepared from a particular class of oligoester diols and triols. A first type of such oligoester modified blocked polyisocyanates is prepared from organic diisocyanates bearing one isocyanate group more reactive than the other, with the more reactive isocyanate first being blocked with a blocking agent and the remaining isocyanate group then being reacted with hydroxyl functionality of an oligoester diol or trioll as referred to above. The second type of oligoester modified blocked polyisocyanate may be prepared by reacting oligoester diols from the aforementioned class of oligoesters with an excess of organic diisocyanate so as to form an isocyanate terminated prepolymer followed by blocking of the terminal isocyanate groups of the prepolymer with an active hydrogen containing blocking agent. Each of these materials is particularly useful in the compositions of the invention and produces final cured coating compositions exhibiting outstanding flexibility.

Oligoesters of the type employed in the preparation of these crosslinking agents are described in U.S. Pat. No. 4,322,508 issued Mar. 30, 1982, the disclosure of which is hereby incorporated by reference. The hydroxy functional oligoesters within the useful class of materials (i) have a number average molecular weight (Mn) of between about 150 and about 3000, preferably between about 230 and about 1000, (ii) bear 2 or 3 hydroxyl groups per molecule, and (iii) are formed by an esterification reaction between a carboxylic acid and an epoxide. The esterification reaction products are selected from the group consisting of:

(a) the esterification reaction product of polycarboxylic acid, i.e., carboxylic acid bearing 2 or more carboxyl groups, and monoepoxide;

(b) the esterification reaction product of polyepoxide, i.e., a compound having 2 or more epoxide groups, and monocarboxylic acid, preferably containing no ethylenic unsaturation, and bearing no hydroxy functionality;

(c) the esterification reaction product of hydroxy functional carboxylic acid and mono- or polyepoxide, preferably monoepoxide;

(d) the esterification reaction product of monocarboxylic acid and hydroxy functional mono- or polyepoxide, preferably monoepoxide; and (e) mixtures of (a) - (d).

As noted above, the first type of oligoester modified blocked polyisocyanate crosslinking agent is prepared by (i) reacting organic diisocyanate bearing one isocyanate group which is more reactive than the other with a sufficient amount of an active hydrogen containing blocking agent to react substantially with all of the more reactive isocyanate groups, thus providing a half-blocked diisocyanate and (ii) reacting this half-blocked intermediate with the above discussed oligoester. The organic diisocyanates employed in this synthesis, as well as the active hydrogen containing blocking agents, are discussed above in connection with the preparation of the isocyanurate ring containing blocked isocyanate crosslinking agents useful in compositions of the invention. The organic polyisocyanate-blocking agent adduct intermediate is formed by reacting a sufficient quantity of the blocking agent with the organic diisocyanate to insure that one of the two—NCO groups on the diisocyanate is reacted. The reaction between the organic diisocyanate and the blocking agent is exothermic; therefore, the diisocyanate and the blocking agent are preferably admixed at temperatures no higher than about 80° C., preferably below about 50° C., to minimize the exothermic effect.

This intermediate is next reacted with the oligoester diol or triol described above so as to react substantially all free or unblocked isocyanate groups of the diisocyanate/blocking agent intermediate with hydroxyl groups of the oligoester. This reaction is carried out desirably at a temperature of about 80°-120° C.

As also discussed above, the second type of oligoester modified blocked polyisocyanate crosslinking agent useful in the novel solvent based coating compositions of the invention is prepared by reacting an excess of organic diisocyanate with an oligoester diol from the above described class of oligoesters followed by reaction of the terminal isocyanate groups formed on the resulant prepolymer with an active hydrogen containing blocking agent as described above so as to react with substantially all the isocyanate groups. The diisocyanate starting material is used in excess in amounts sufficient to insure that the intermediate is isocyanate terminated. Therefore, it is preferable that the organic diisocyanates and the dihydroxy functional oligoester be reacted in a molar ratio of from greater than 1:1 up to 2:1. Numerous diisocyanates of the type described hereinbefore may be employed in the preparation of this intermediate. While it is not necessary that one isocyanate group be more reactive than the other, the preparation of this type of crosslinking agent does not preclude the use of such material.

D. General Discussion - Other Aspects of Invention and Other Components

The coating compositions of the invention have been found to provide a cured coating having the advantageous physical properties described above, over a wide range of cure temperatures and a wide range of solids levels. More specifically, the coating compositions according to preferred embodiments of the invention have been found to cure at temperatures from as low as about 120° C. or less within about 15 minutes or less, and yet to cure and suffer no significant loss of advantageous physical properties at temperatures as high as about 200° C. or more for periods up to about 60 minutes or more. Considered together with the storage stability of the coating composition, it can be readily recognized that the present invention provides a highly significant advance in the coating composition art.

It will be within the skill of the art to determine the proper volatile organic content for a given coating composition of the invention and for a given application. Preferred solvents have relatively low volatility at temperatures appreciably below their boiling points such that solvent evaporation is low during storage and/or application of the coating composition to the substrate. A suitable solvent system may include, for example, toluene, methyl ethyl ketone, isobutyl acetate, xylene, cellosolve acetate, acetone and a mixture of any of them. Other solvents which may be employed include terpenes, aliphatic and aromatic naphthas, and the like. Additional suitable solvents are commercially available and will be apparent to the skilled of the art in view of the present disclosure.

Any solvent allowed to remain in the cured coating should be inert so as to avoid adverse effect upon the cured coating or upon another coating layer used in conjunction with it during the curing process or thereafter. Preferably, the cured coating is substantially free of solvent.

Sufficient solvent is used to reduce the viscosity of the coating composition to a level suitable for application to the substrate in the desired manner.

Obviously, in those cases where the composition is to be applied as a chip resistant primer the amount of solvent will be reduced so as to give a solids level of about 65-80%. Such higher solids materials are generally applied using hot spray equipment.

Flow control agent(s), for example, polybutyl acrylate; wetting agent(s), for example, silicone; pigments; pigment dispersants; corrosion inhibitors, for example, chromate pigments, numerous of all of which are known to the skilled of the art, may be employed in the coating compositions of the invention. In addition, suitable reactive additives can be used, including, for example, low molecular weight diol flow control agents and reactive diluents. Compositions of the invention, and in particular the chip resistant primers of the invention, may also include anti-settling or anti-sagging agents to control the thixotropic properties of the composition. Exemplary of available materials suitable for this purpose are Dislon (trademark) 6900-20X manufactured by Kusumoto Chemicals, Ltd., Tokyo, Japan and sold by King Industries, Norwalk, Conn. 06852; Bentone (trademark) 38, N. L. Industries, Highstown, N.J. 08520; and Cab-O-Sil (trademark) M-5, Cabot Corporation, Boston, Mass.

Curing the coating composition requires baking for sufficient time at sufficiently elevated temperature to react the crosslinking agent with the hydroxyl functionality of the hydroxy functional epoxy ester resin and the polycaprolactone diol. The time and temperature required to cure the coating are interrelated and depend upon the particular hydroxy functional epoxy ester resin, polycaprolactone diol crosslinking agent, solvent and other materials, if any, and the amount of each comprising the coating composition. The coating compositions according to preferred embodiments of the invention, as described above, have been found to provide the best coating results when cured at temperature at about 150° C. (300° F.) for 20 minutes. It is a highly significant advantage of the invention, however, that these same coating compositions can withstand, for example, temperature as high as about 200° C. (390° F.) for periods of time as long as about 60 minutes. Accordingly, great flexibility is provided in both designing and implementing a curing schedule for parts coated with the coating compositions of the invention. Thus, in the assembly of automotive vehicles, for example, vehicles unavoidably held in a curing oven for long periods of time during unplanned assembly line shut-downs are recovered with cured and unharmed coatings.

High solids coating compositions according to the present invention, comprising the crosslinkable hydroxy functional epoxy ester resins of the invention, especially the preferred resins described above, the polycaprolactone diol, especially the preferred polycaprolactone diols described above, and blocked polyisocyanate crosslinking agent, especially the preferred materials described above have been found to afford cured coatings with improved corrosion resistance and chip resistance, thus representing a highly advantageous advance in the art.

A most preferred use of the coating composition of the invention is as a high solids hot sprayable chip resistant primer for use on a bare metal substrate such as for an automotive vehicle body which is subject to chipping. Primer compositions typically are pigmented and any pigments commonly included in primer compositions for metal substrates and acrylic dispersion topcoats such as, for example, carbon black, iron oxide, lithopone, magnesium, silicate, silica, barium sulfate, TiO2, chrome yellow, calcium chromate, strontium chromate, zinc potassium chromate any the like may be used. The primer can be pigmented according to known methods including, for example, by grinding pigments in a portion of the curable resin and adding to the primer composition.

The pigment-to-binder ratio of the chip resistant primer may be from about as 0.5:1 to about 2:1 by weight, respectively; it is preferred, however, to use a primer having a pigment-to-binder ratio of from about 1:1 to about 1.5:1 by weight, respectively.

In preferred embodiments of this invention pigments and thixotropic agents desireably are dispersed with epoxy ester resins. One type of epoxy ester resin useful for this purpose comprises the reaction product of diepoxide, diphenol and/or dimer acid and a mixture of Soya fatty acid and propionic acid (See Example 3). Other epoxy ester resins useful for this purpose are those disclosed in U.S. patent applications Ser. Nos. 448,886 filed June 14, 1982 (abandoned), 431,465 filed Sept. 30, 1982 (abandoned) and in U.S. Pat. No. 4,491,164, all assigned to the assignee of this application. These resins comprise the simultaneous reaction product of diepoxide with (i) diphenol, dicarboxylic acid or a mixture of them in chain extension reaction and (ii) fatty acid in chain terminating esterification reaction. Still other suitable epoxy resins useful for dispersing pigment and thixotropic agents will be apparent to the skilled of the art in view of the present disclosure.

No special expedients are necessary in formulating the primer compositions of this invention. For example, they may be prepared simply by incorporating the resinous components in a suitable solvent system. Thus, for example, by suitable mixing or agitation, each resinous component may be dissolved in a solvent and the resulting solutions combined to form finished primer compositions.

The solvent system may be any suitable combination of organic solvents as described above. For a high solids, hot sprayable, automotive vehicle chip resistant primer, the solvent will comprise preferably about 20 to about 40 percent by weight of the total coating compositions, although of course, larger or smaller amounts may be utilized depending upon the solids content desired.

The primer is generally maintained at about 65 to about 80 percent solids content for hot spraying purposes with conventional thinners such as aromatic hydrocarbons, commercial petroleum cuts which are essentially aromatic, and the like, and sprayed onto the metal base or other substrate and cured. The primer may be applied in greater thickness of 1 to 25 mils wet, preferably 10 to 25 mils wet, in order to obtain final coatings in the desired range of 5–11 mils in regions highly susceptible to chipping and is then feathered down in thickness to the thickness of paints in areas not receiving a chip resistant primer. The primer is cured at elevated temperatures by any convenient means such as baking ovens or banks of infra-red heat lamps. Curing temperatures are preferably from about 135° C. to about 165° C., although curing temperatures from about 100° C. to about 230° C. may be employed, if desired.

The invention will be further understood by referring to the following detailed examples. It should be understood that these specific examples are presented by way of illustration and not by way of limitation. Unless otherwise specified, all references to "parts" are intended to mean parts by weight.

EXAMPLE 1

Preparation of Hydroxy Functional Epoxy Ester Resin

In a suitable reactor were charged 517 parts Epon 829 (trademark, Shell Chemical Co., diepoxide), 137 parts bisphenol-A and 169 parts Empol 1016 (trademark, Emery Ind., Inc., dimer acid). The temperature of the mixture was brought up to about 180° C., at which point an exothermic reaction took place that raised the temperature to about 200° C. After one hour, the acid number was found to be less than 1. 117 parts of 2,2-bis(hydroxymethyl) propionic acid and 1 part of ethyltriphenylphosphonium iodide were added and the temperature was kept at 180° C. for an additional hour. The reaction product was then cooled down to 120° C. and 627 parts of M-pyrol were added. The resin had a viscosity of $Z_6$, acid number of 3 at 60% soilds (i.e. nonvolatile solids).

EXAMPLE 2

Preparation of Hydroxy Functional Epoxy Ester Resin

In a suitable reactor were charged 519 parts Epon 829 (trademark, Shell Chemical Co., diepoxide), 137 parts bisphenol-A and 54 parts azelaic acid. The temperature of the mixture was brought up to about 180° C., at which point an exothermic reaction took place that raised the temperature to about 200° C. After one hour, the acid number was found to be less than 1. 171 parts 2,2-bis(hydroxymethyl) propionic acid and 1 part ethyltriphenylphosphonium iodide were added and the temperature was kept at 180° C. for an additional hour. The reaction product was then cooled down to 120° C. and 881 parts of M-pyrol were added. The resin had a viscosity of $Z_2$, acid number of 5 at 50% solids.

EXAMPLE 3

Preparation of Epoxy-Ester Dispersing Resin

In a suitable reactor were charged 1380 parts Epon 829 (trademark, Shell Chemical Co., diepoxide), 954 parts Empol 1016 (trademark, Emery Ind., Inc., dimer acid), 364 parts Soya fatty acid, 268 parts 2,2-bis(hydroxymethyl) propionic acid, and 13 parts lithium neodeconoate. The temperature of the mixture was brought up to about 180° C., at which point an exothermic reaction took place that raised the temperature to about 200° C. After one hour the acid number was found to be less than 2. 940 parts Solvesso 100 and 305 parts Solvesso 150 were added, and the mixture was cooled. The resin had a viscosity of $Z_7$ at 70.0% solids.

EXAMPLE 4

Preparation of Blocked Polyisocyanate Crosslinking Agent

In a suitable reactor were charged 780 parts of methylethyl ketoxime and 180 parts Solvesso 100. 1330 parts of PAPI 27 (trademark, The UpJohn Company, aromatic polyisocyanate) was added ropwise to the mixture over two hours; the reaction temperature rose from room temperature to 80°–95° C. 39 parts 2-ethylhexanol was added to the mixture and the temperature of the mixture was maintained at 85°–95° C. for one hour. At that point, 816 parts of M-pyrol was added and the mixture was cooled. The resulting resin was dark brown and had a viscosity of 6000 cps at 67.0% solids.

EXAMPLE 5

Preparation of Blocked Polyisocyanate Crosslinking Agent

Into a suitable reactor were charged 537 parts methylethyl ketoxime. 784 parts PAPI 94 (trademark, The UpJohn Company, aromatic polyisocyanate) was added dropwise over two hours; the reaction temperature rose from room temperature to 85°–95° C. The temperature of the mixture was maintained at 85°–95° C. for one hour. The mixture was then checked to insure complete reaction of the isocyanate by infrared spectroscopy. At that point, 300 parts methylamyl ketone and 150 parts M-pyrol were added and the mixture was cooled. The resulting resin was dark brown and was 75% solids.

EXAMPLE 6–9

Preparation of Blocked Polyisocyanate Crosslinking Agent

Blocked isocyanate crosslinkers according to the invention were prepared in the manner of Example 5. The components employed are shown in the table below.

| Composition | Example | | | |
|---|---|---|---|---|
| | 6 | 7 | 8 | 9 |
| | Parts | | | |
| L-2991 A* | 360 | 360 | 360 | |
| Desmodur IL* | | | | 525 |
| methyl amyl ketoxime | 174 | | | 87 |
| benzotriazole | | 238 | | |
| epsilon-caprolactam | | | 228 | |
| N—methyl pyrolidone | 133 | 150 | 195 | 461 |
| % solids | 80 | 80.1 | 75.1 | 57 |
| Viscosity | $Z_1$ | $Z_6$ | $Z_2$ | Z |

*Trademarks of Mobay Chemical Co.; L-2291 A is a biurette of hexamethylene diisocyanate; Desmodur IL is a polyisocyanurate of tolylene diisocyanate.

EXAMPLE 10

Millbase Preparation

In a one gallon can or ballmill were charged the following materials and one quart of diagonal shot. The mixture was placed on a roller mill for 16–24 hours to reach a 7+ hegman dispersion. At that point, the letdown was added, and the mixture was run an additional hour on the roller mill.

| | Parts |
|---|---|
| Hi-Sol #3* | 585 |
| 2-Ethyl Hexanol | 95 |
| Polyethylene Wax | 70 |
| Anti-Terra-U** | 40 |
| Resin of Example 3 | 103 |
| Barytes | 2259 |
| TiO$_2$ | 429 |
| Carbon Black | 29 |
| Strontium Chromate | 143 |
| Letdown: | |
| Resin of Example 3 | 247 |

*Trademark of Ashland Chemical Co., Columbus, Ohio; Hi-Sol #3 is an aromatic solvent.
**Trademark of Byk Mallinckrodt, Wallingford, CT 06492; Anti-Terra-U is an antisettling and wetting agent.

EXAMPLE 11

Bentone Gel Preparation

To a clean Ball Mill were charged the following:

| | Parts |
|---|---|
| Solvesso 150 | 513 |
| Propylene Carbonate | 13 |
| Bentone 38 | 30 |
| Grind 30 minutes, then add: | |
| Resin of Example 3 | 384 |
| Grind approximately 2 Hrs. to 8 Hegman | |
| Letdown with: | |
| Solvesso 150 | 60 |
| | 1000 |

EXAMPLES 12–14

Coating compositions were formulated according to the invention as follows:

| Composition | Example | | |
|---|---|---|---|
| | 12 | 13 | 14 |
| | Parts | | |
| Resin of Example 1 | 1499 | 1499 | |
| Resin of Example 2 | | | 1799 |
| Millbase of Example 11 | 5788 | 5788 | 5788 |
| TONE 0260[1] | 950 | 950 | 950 |
| Bentone Gel of Example 12 | 2315 | 2315 | 2315 |
| Crosslinker of Example 5 | 984 | | 984 |
| Crosslinker of Example 7 | | 1050 | |
| Dislon[2] | 114 | 120 | 114 |
| Cab-O-Sil[3] | 142 | | 142 |

[1]Trademark of Union Carbide, Danbury, Connecticut, TONE 0260 a polycaprolactone diol.
[2]Trademark of Kusumoto Chemicals, Ltd.; Dislon is an anti-sagging agent.
[3]Trademark of Cabot Corp., Boston, Mass.; Cab-O-sil is a fumed silica (anti-settling agent).

The coating compositions were prepared by sequential mixing in a 5 gallon working capacity EMCO Proto-Lab SW Mill (trademark), Epworth Mfg. Co., South Haven, Mich., set at 900 rpm. Resin and Dislon were first mixed for approximately 10 minutes and then millbase, Bentone gel and crosslinker were added sequentially while mixing. Finally Cab-O-Sil was added and the composition mixed until a grind of 6+ on the Hegman scale was obtained.

The above compositions were sprayed at 140°–160° C. using hot-spray equipment commercially available from Nordson Corp. Unpolished Bonderite steel panels were sprayed and baked at 135° C. for 20 minutes. The thickness of the coating tested varied from 5 mils to 12 mils. The panels were top-coated with white enamel and tested for chip resistance using 10 pts. of gravel in the gravelometer test. All the above compositions exhibited excellent chip resistance. In addition, panels were tested for corrosion resistance (500 hrs. salt spray test, scribed panels) and humidity resistance with excellent results.

EXAMPLES 15–18

Additional coating compositions according to the invention are shown below.

| Composition | Example | | | |
|---|---|---|---|---|
| | 15 | 16 | 17 | 18 |
| | Parts | | | |
| Resin-Example 2 | 1799 | 1799 | 1799 | 1799 |
| TONE 0260[1] | 950 | 950 | 950 | 950 |
| Millbase-Example 11 | 5788 | 5788 | 5788 | 5788 |
| Gel-Example 12 | 2315 | 2315 | 2315 | 2315 |
| Crosslinker-Example 7 | 922 | | | |
| Crosslinker-Example 8 | | 922 | | |

-continued

| Composition | Example | | | |
|---|---|---|---|---|
| | 15 | 16 | 17 | 18 |
| | Parts | | | |
| Crosslinker-Example 9 | | | 984 | |
| Crosslinker-Example 10 | | | | 1294 |
| Dislon[2] | 100 | 100 | 100 | 100 |

[1]Trademark of Union Carbide, Danbury, Connecticut. TONE 0260 is a polycaprolactone diol.
[2]Trademark of Kusumoto Chemicals, Ltd. Dislon is an anti-sagging agent.

Industrial Application

It will be apparent from the foregoing that this invention has industrial applicability as a coating composition, especially as a hot sprayable, high solids coating composition suitable for use as a chip resistant automotive vehicle primer adapted for use on body panel areas subject to chipping by stones, gravel and other road debris.

In view of this disclosure, many modifications of this invention will be apparent to those skilled in the art. It is intended that all such apparent modifications fall within the true scope of this invention and be included within the terms of the appended claims.

We claim:

1. An organic solvent based thermosetting coating composition comprising
   (A) hydroxy functional epoxy ester resin having a number average molecular weight ($M_n$) between about 1,000 and about 4,000 and being the reaction product of (1) a chain extended product of diepoxide with diphenol and dicarboxylic acid and (2) acid component in chain termination, said acid component comprising primary hydroxy functional acid and a fatty acid and reacted in about 1 to 1 equivalent ratio to chain extended product, wherein said diepoxide is reacted substantially simultaneously with said diphenol and dicarboxylic acid in amounts sufficient to give a weight per epoxide between about 500 and about 2,500;
   (B) linear polycaprolactone diol having a molecular weight between about 1500 and about 5000, wherein said (A) and (B) are included in said composition in a weight ratio between about 4:1 and 1:4; and
   (C) blocked polyisocyanate crosslinking agent comprising at least two isocyanate groups which have been blocked by reaction with an active hydrogen bearing blocking agent, which crosslinking agent de-blocks at the cure temperature of said composition, said crosslinking agent being included in said composition in an amount equal to between about 10 and 50 percent of the combined weight of said (A) and (B) in said composition.

2. A solvent based, thermosetting coating composition in accordance with claim 1, wherein said fatty butyric, lauric, palmitic and stearic fatty acids and mixtures thereof.

3. A solvent based, thermosetting coating composition in accordance with claim 2, wherein said hydroxy functional epoxy ester resin is the reaction product of said diepoxide with said diphenol and said dicarboxylic acid and, subsequently with said acid component.

4. A solvent based, thermosetting coating composition in accordance with claim 1, wherein said hydroxy functional epoxy ester resin is the reaction product of said diepoxide reacted substantially simultaneously with said diphenol, said dicarboxylic acid and with said acid component.

5. A solvent base, thermosetting coating composition in accordance with claim 1, wherein said diepoxide is reacted substantially simultaneously with said diphenol and dicarboxylic acid in amounts sufficient to give a weight per epoxide between about 500 and about 1,500.

6. A solvent base, thermosetting coating composition in accordance with claim 1, wherein said polycaprolactone diol has a molecular weight between about 2000 and 4000.

7. A solvent based, thermosetting coating composition in accordance with claim 1, wherein said (A) and (B) are included in said composition in a weight ratio of about 1:1.

8. A solvent based, thermosetting coating composition in accordance with claim 1, wherein said blocked polyisocyanate crosslinking agent is included in said composition in an amount between about 20 and about 40 percent of the combined weight of components (A) and (B) in said composition.

9. A solvent based, thermosetting coating composition in accordance with claim 1, wherein said diepoxide is selected from the group consisting of bisphenol-A epichlorohydrin epoxy resin, hydantoin epoxy resin, cyclic and acyclic aliphatic diepoxides and mixtures thereof.

10. A solvent based, thermosetting coating composition in accordance with claim 1, wherein said diphenol is selected from the group consisting of bisphenol-A, bisphenol-B, bisphenol-F and mixtures thereof.

11. A solvent based, thermosetting coating composition in accordance with claim 1, wherein said dicarboxylic acid is selected from the group consisting of saturated or unsaturated, cyclic or acyclic, aliphatic or aromatic dicarboxylic acids and mixtures thereof.

12. A solvent based, thermosetting coating composition in accordance with claim 1, wherein said dicarboxylic acid is selected from the group consisting of substantially saturated, acyclic, aliphatic dimer acids of about 4-42 carbons.

13. A solvent based, thermosetting coating composition in accordance with claim 1, wherein said primary hydroxy functional acid is selected from $C_3$-$C_{26}$ acids bearing a single carboxyl group, at least one primary hydroxyl group, and no additional functionality which would react substantially with the chain extension reactants or reaction product.

14. A solvent based, thermosetting coating composition in accordance with claim 1, wherein said polycaprolactone diol is the product of polymerization of lactone monomers in the presence of initiator compounds having two functional groups each having an active hydrogen capable of opening the lactone ring at a temperature of between about 50° C. and 300° C., said lactone monomer having the general formula:

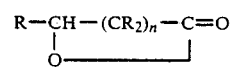

wherein n is at least 4, at least n+2 R's are H and the remaining R's are substituents selected from the group consisting of alkyl, cycloalkyl, alkoxy and single ring aromatic hydrocarbon radicals.

15. A solvent based, thermosetting coating composition in accordance with claim 14 wherein said initiator compounds are selected from the group consisting of diamines, diols, amino alcohols, diacids and hydroxy carboxylic acids.

16. A solvent based, thermosetting coating composition in accordance with claim 14 wherein said lactone monomers comprise unsubstituted epsilon-caprolactone monomers.

17. A solvent based, thermosetting coating composition in accordance with claim 1, wherein said blocked polyisocyanate crosslinking agent comprises blocked polymethylene polyphenol isocyanate which unblocked has the formula:

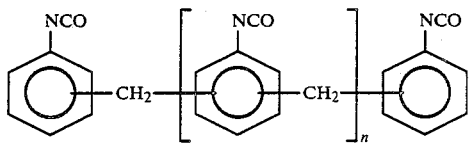

wherein n equals 1 to 3.

18. A solvent based, thermosetting coating composition in accordance with claim 1, wherein polyisocyanate employed in the preparation of said blocked polyisocyanate crosslinking agent comprises isocyanurate ring containing polyisocyanate prepared by cyclotrimerization of diisocyanate.

19. A solvent based, thermosetting coating composition in accordance with claim 1, wherein said blocked polyisocyanate crosslinking agent is the reaction product of:
(a) the reaction product of (i) organic diisocyanate represented by the formula:

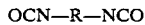

OCN—R—NCO wherein R is selected from the group consisting of aliphatic, cycloaliphatic and aromatic radicals and combinations thereof and wherein one of the isocyanate groups thereof is a more reactive isocyanate group than the other isocyanate group and (ii) sufficient active hydrogen containing blocking agent to react with substantially all of said more reactive isocyanate groups; and
(b) sufficient polyol to react with substantially all of said other isocyanate groups.

20. A solvent based, thermosetting coating composition in accordance with claim 1, adapted to be used as a chip resistant primer to be sprayed at elevated temperature, wherein the solids level of the composition is in the range of 60–80% by weight.

21. An organic solvent based, thermosetting coating composition comprising:
(A) hydroxy functional epoxy ester resin having a number average molecular weight ($\overline{M}_n$) of between about 1,000 and about 4,000, and being the reaction product of (1) a chain extended product of (i) diepoxide selected from the group consisting of bisphenol-A epichlorohydrin epoxy resin, hydantoin epoxy resin, cyclic and acyclic aliphatic diepoxide and mixtures thereof, (ii) diphenol selected from the group consisting essentially of bisphenol-A, bisphenol-B, and bisphenol-F and mixture thereof (iii) dicarboxylic acid consisting essentially of the dimerization product of C-18 fatty acid and (2) acid component in chain termination reaction comprising hydroxy functional acid and a fatty acid and reacted in about a 1-to-1 equivalent ratio to chain extended product, said acid component selected from the group consisting of dimethylolpropionic acid, bis(hydroxy ethyl)propionic acid, bis(hydroxy propyl)propionic acid, and mixtures thereof and said fatty acid selected from the group consisting of soya fatty acid, butyric, lauric, palmitic and stearic fatty acids and mixtures thereof, said diepoxide being reacted substantially simultaneously with said diphenol and dicarboxylic acid in amounts sufficient to give a weight per epoxide between about 500 and about 2,500;
(B) linear polycaprolactone diol having a molecular weight between about 1500 and about 5000 and made by polymerizing epsilon-caprolactone monomer in the presence of compounds having two functional groups each having an active hydrogen capable of opening the lactone ring and at a temperature between about 50° C. and about 300° C., wherein said (A) and (B) are included in said composition in a weight ratio between about 4:1 and 1:4; and
(C) blocked polyisocyanate crosslinking agent comprising at least two isocyanate groups which have been blocked by reaction with an active hydrogen bearing blocking agent, which un-blocks at the cure temperature of said composition, said blocked polyisocyanate being selected from blocked aliphatic, aromatic, cycloalkylene, aliphatic aromatic and nuclear substituted aromatic polyisocyanates, said crosslinking agent being included in said composition in an amount equal to between about 10 and 50 percent of the combined weight of said (A) and (B) in said composition.

* * * * *